US012627106B2

(12) United States Patent
Choi et al.

(10) Patent No.: US 12,627,106 B2
(45) Date of Patent: May 12, 2026

(54) HOLDER DEVICE FOR POWER SUPPLY RAIL

(71) Applicants: Hyundai Motor Company, Seoul (KR); Kia Corporation, Seoul (KR); Hyundai Mobis Co., Ltd., Seoul (KR)

(72) Inventors: Yong Won Choi, Seoul (KR); Hye Kyung Kim, Gyeonggi-Do (KR); Dae Hee Lee, Incheon (KR); Myung Hoe Kim, Seoul (KR); Yeong Jae Jang, Seoul (KR); Kwan Woo Lee, Gyeonggi-Do (KR)

(73) Assignees: Hyundai Motor Company, Seoul (KR); Kia Corporation, Seoul (KR); Hyundai Mobis Co., Ltd., Seoul (KR)

( * ) Notice: Subject to any disclaimer, the term of this patent is extended or adjusted under 35 U.S.C. 154(b) by 593 days.

(21) Appl. No.: 18/063,675

(22) Filed: Dec. 8, 2022

(65) Prior Publication Data

US 2023/0402803 A1 Dec. 14, 2023

(30) Foreign Application Priority Data

Jun. 10, 2022 (KR) ........................ 10-2022-0070437

(51) Int. Cl.
*H01R 33/92* (2006.01)
*H01R 25/14* (2006.01)

(52) U.S. Cl.
CPC ........... *H01R 33/92* (2013.01); *H01R 25/142* (2013.01)

(58) Field of Classification Search
CPC .. H01R 33/92; H01R 25/142; H01R 2201/26; B60R 2011/0005; B60R 2011/0084; B60R 2011/0085; B60R 2011/0089; B60R 2011/0075
See application file for complete search history.

(56) References Cited

U.S. PATENT DOCUMENTS

| | | | | |
|---|---|---|---|---|
| 10,142,824 | B2 | 11/2018 | Hagihara et al. | |
| 10,440,853 | B2 * | 10/2019 | Muldowney ........... | H05K 7/183 |
| 10,967,807 | B1 | 4/2021 | Hessheimer | |
| 11,746,047 | B2 * | 9/2023 | Chien .................... | H05B 45/30 501/15 |

FOREIGN PATENT DOCUMENTS

| | | | | | |
|---|---|---|---|---|---|
| CN | 210350315 | U | * 4/2020 | ........... | H01R 25/142 |
| CN | 113823956 | A | * 12/2021 | ........... | H01R 25/142 |
| EP | 3702193 | A1 | 9/2020 | | |
| JP | 2017056852 | A | 3/2017 | | |
| KR | 101880483 | B1 | 7/2018 | | |
| KR | 102346301 | B1 | 12/2021 | | |
| WO | WO-2022254113 | A1 | * 12/2022 | ......... | B60R 11/0235 |

* cited by examiner

*Primary Examiner* — Renee S Luebke
*Assistant Examiner* — Paul D Baillargeon
(74) *Attorney, Agent, or Firm* — Fox Rothschild LLP

(57) ABSTRACT

Provided is a holder device for a power supply rail, the holder device including a main body part positioned inside a power supply rail mounted in a vehicle interior and provided to be slidably movable in a rail direction, a head part rotatably coupled to the main body part, configured to fix a sliding movement position of the main body part inside the power supply rail, and formed to contact a pair of electrodes provided inside the power supply rail, and a fixing part formed to selectively protrude to an outside of the main body part when the head part rotates and provided to support an inner side of the power supply rail in a state in which the sliding movement position of the main body part is fixed.

20 Claims, 10 Drawing Sheets

HOLDER DEVICE FOR POWER SUPPLY RAIL

CROSS-REFERENCE TO RELATED APPLICATION

This application claims, under 35 U.S.C. § 119(a), the benefit of Korean Patent Application No. 10-2022-0070437, filed on Jun. 10, 2022, the entire contents of which are incorporated herein by reference.

BACKGROUND

Technical Field

The present disclosure relates to a holder device for a power supply rail. More particularly, it relates to a holder device for a power supply rail configured to be slidably movable along a power supply rail and fixed in the power supply rail in a state in which a mobile device is mounted on the holder device.

Background

In general, a lighting fixture is mainly installed on the ceiling and is fixedly installed at a determined location at the time of initial construction of the lighting fixture in order to equally provide a light source to the indoor space.

However, since this lighting fixture is fixedly installed on the ceiling, it is difficult to move and rearrange the same depending on personal preference or the like. Accordingly, when the lighting fixture fixedly installed thereon is moved and rearranged, complicated and dangerous work such as wire arrangement construction is required to be performed by professional personnel.

To this end, in the case of a place in which a lighting fixture is required to be moved frequently, a power supply rail may be used to facilitate movement of the lighting fixture. Further, various electronic devices such as a fan in addition to the lighting fixture may be detachably installed on the power supply rail, and the power supply rail may also be mounted on a place such as a wall surface as well as a ceiling.

Meanwhile, in recent years, the use of a liquid crystal monitor, a terminal, and the like configured to enable a user to watch a TV broadcast, a stored image, and navigation inside a vehicle has increased. Accordingly, the use of a holder configured to fix such a mobile device also has increased.

However, in the case of such a holder, since the holder is mounted on a vehicle air outlet and fixed thereto, damage to the air outlet may occur due to the weight of a mobile device mounted on the holder. Additionally, when a user wants to move the location of the mobile device, the holder is required to be removed from the air outlet and re-mounted at a desired location, which may cause inconvenience in use.

In addition, in the state in which a mobile device is mounted on a holder, a power line is required to be separately connected to the mobile device to recharge the mobile device, which may spoil the aesthetics of the interior of the vehicle and may also cause a user to be exposed to the risk of electric shock.

Therefore, it is important not only to enable a holder having a mobile device mounted thereon to easily move and to be easily mounted in the vehicle, but also not to expose a power line to the outside, thereby previously preventing problems related to the aesthetics of the interior of the vehicle and safety of a user.

The above information disclosed in this Background section is only for enhancement of understanding of the background of the invention, and therefore it may contain information that does not form the prior art that is already known in this country to a person of ordinary skill in the art.

SUMMARY OF THE DISCLOSURE

The present invention has been made in an effort to solve the above-described problems associated with the prior art, and it is an object of the present invention to provide a holder device for a power supply rail, the holder device including a main body part inserted into a power supply rail mounted in the vehicle interior and configured to be slidably movable. A sliding movement position of the main body part in the power supply rail is fixed through the rotation of a head part, and the main body part is additionally fixed in the power supply rail through a fixing member configured to selectively protrude from the main body part when the head part rotates, thereby making it possible to secure rigidity in the fixed state of the movement position of a mobile device mounted on the main body part.

In one aspect, the present invention provides a holder device for a power supply rail, the holder device including a main body part positioned inside a power supply rail mounted in a vehicle interior and provided to be slidably movable in a rail direction, a head part rotatably coupled to the main body part, configured to fix a sliding movement position of the main body part inside the power supply rail, and formed to contact a pair of electrodes provided inside the power supply rail, and a fixing part formed to selectively protrude to an outside of the main body part when the head part rotates and provided to support an inner side of the power supply rail in a state in which the sliding movement position of the main body part is fixed.

In a preferred embodiment, the main body part may include a stepped part formed to be locked in the power supply rail and configured to expose the head part rotatably coupled thereto to an outside of the power supply rail.

In some embodiments, the main body part may be formed in a rectangular enclosure shape.

In another preferred embodiment, the head part may include a rotation guide positioned in front of the main body part and formed to be exposed to the outside of the power supply rail, the rotation guide including a connection member to be connected to a holder, a body coupled to the rotation guide inside the main body part and provided to be rotated simultaneously with rotation of the rotation guide, and a pair of lock anchors formed to protrude from the body and positioned to be locked inside the power supply rail, wherein each of the pair of lock anchors may have a contact terminal mounted therein and configured to contact the electrode.

In some embodiments, when the body is rotated by the rotation guide, the body may be stably rotated along a predetermined path by allowing a plurality of guide members provided inside the main body part to be inserted into the body.

In still another preferred embodiment, the rotation guide may be formed in the same rectangular enclosure shape as a shape of the main body portion, and may rotate at intervals of 90°.

In yet another preferred embodiment, the lock anchor may be formed to protrude to the outside of the main body part through a guide hole provided in the main body part when the rotation guide rotates to be locked in a locking groove provided in the power supply rail, and may be electrically connected to the power supply rail through grounding between the electrode and the contact terminal.

In some embodiments, the locking groove may be provided at each of the upper and lower portions of the power supply rail.

In still yet another preferred embodiment, the power supply rail may include an electrode fixing part provided inside the locking groove to fix the electrode.

In still yet another preferred embodiment, the electrode fixing part configured to fix the electrode in a direction toward the contact terminal by elasticity thereof.

In a further preferred embodiment, the fixing part may include a fixing member inserted into the body and configured to selectively protrude to the outside of the main body part when the body rotates, and a cam movement groove formed on an outer circumferential surface of the fixing member, wherein the cam movement groove may have a protruding member inserted thereinto, the protruding member being provided inside the body, and may form a path configured to allow the protruding member to move therealong when the body rotates.

In another further preferred embodiment, the cam movement groove may be formed in a spiral shape so that the cam movement groove is pressed by the protruding member moving along the path when the body rotates whereby the fixing member may protrude to the outside of the main body part.

In still another further preferred embodiment, the fixing part may further include an elastic member mounted on one side of the fixing member and formed to selectively contact the inner side of the power supply rail when the fixing member protrudes.

In another aspect, the present invention provides a holder device for a power supply rail, the holder device including a main body part positioned inside a power supply rail mounted on a front of a dashboard forming a vehicle interior and provided to be slidably movable in a rail direction, a head part rotatably coupled to the main body part and configured to fix a sliding movement position of the main body part inside the power supply rail, the head part including a connection member to be connected to a holder, and a fixing part formed to selectively protrude to an outside of the main body part when the head part rotates and provided to support an inner side of the power supply rail in a state in which the sliding movement position of the main body part is fixed.

In a preferred embodiment, at least one or more of the main body parts may be formed to be positioned together inside the power supply rail, and the head part may be rotatably coupled to the main body part whereby each of the holders having different mobile devices mounted thereon may be mounted on a corresponding one of the connection members.

In another embodiment, a vehicle comprising the holder device may be provided. The power supply rail may be mounted in a vehicle interior.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
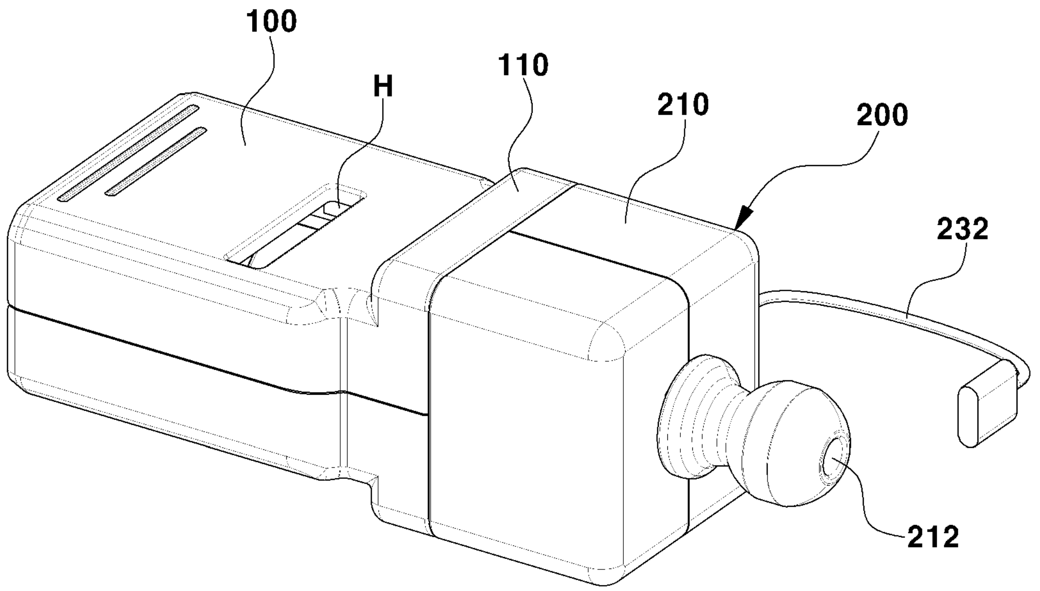
FIG. 1 is a view showing a configuration of a holder device for a power supply rail according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms “a,” “an” and “the” are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Hereinafter, preferred embodiments according to the present invention will be described in detail with reference to the accompanying drawings.

Advantages and features of the present invention and a method of achieving the same will become apparent with reference to the embodiments described below in detail with reference to the accompanying drawings.

However, the present invention is not limited to the embodiments disclosed below, but will be implemented in various different forms. The embodiments are provided to ensure that the disclosure of the present invention is complete, and to fully convey the scope of the invention to those skilled in the art to which the present invention pertains. The present invention is only defined by the scope of the claims.

In addition, in the description of the present invention, if it is determined that related known techniques or the like may obscure the gist of the present invention, a detailed description thereof will be omitted.

Figure 2:
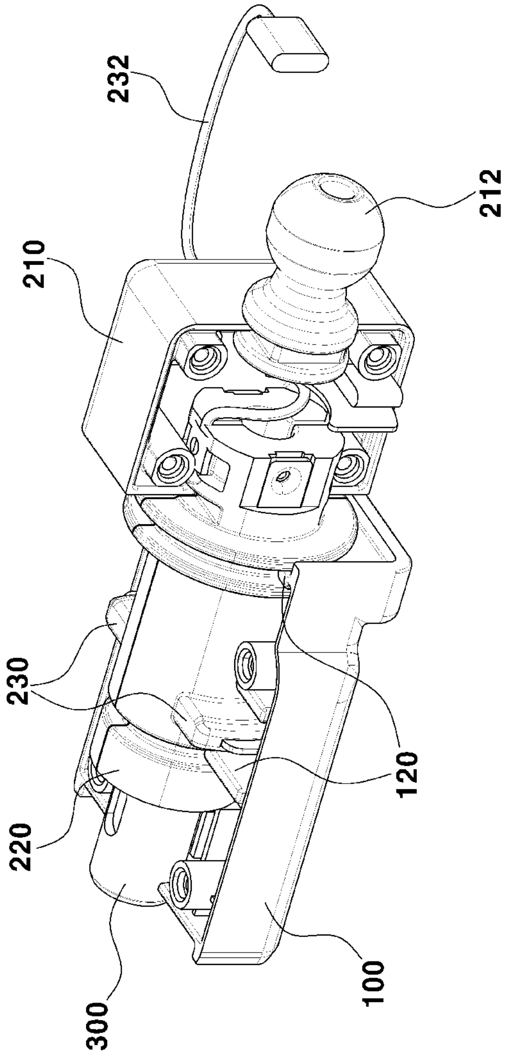
FIG. 2 is a view showing an internal structure of the holder device for the power supply rail according to the embodiment of the present invention.
Figure 3:
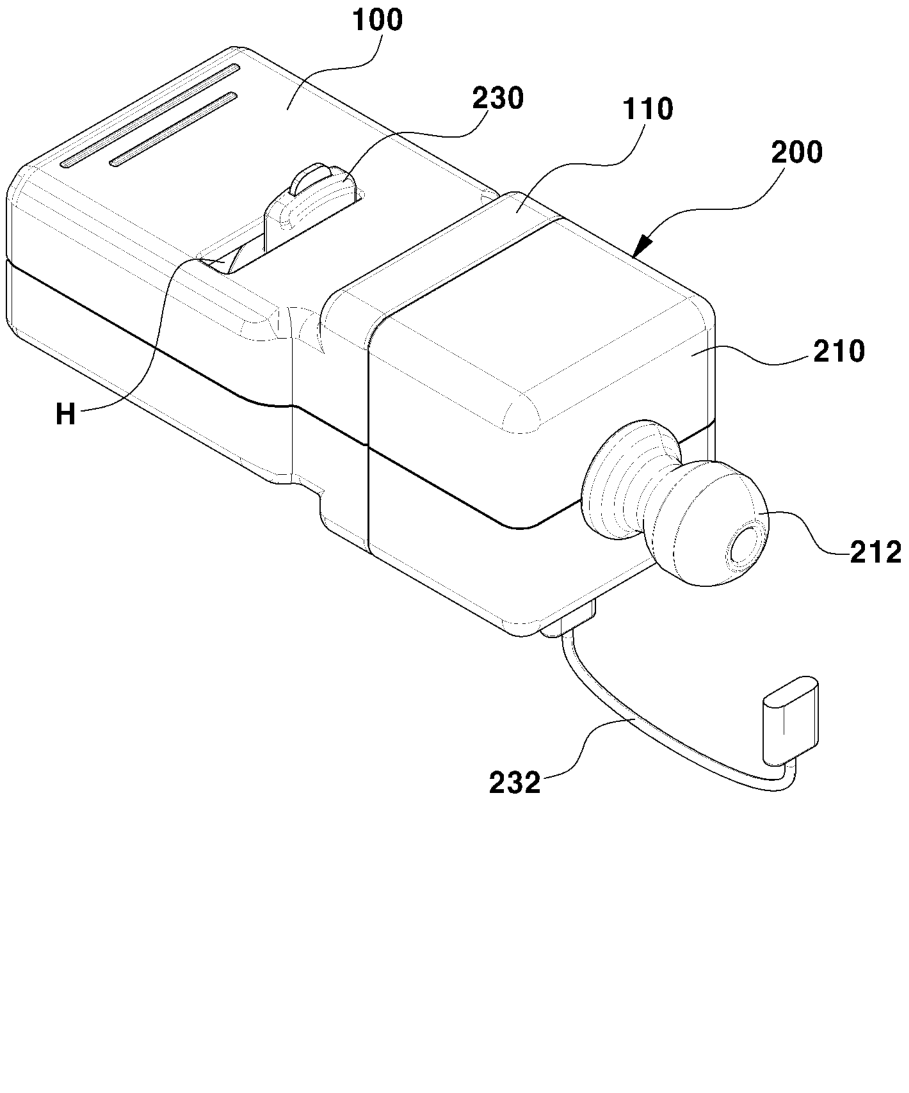
FIG. 3 is a view showing an operating state of the holder device for the power supply rail according to the embodiment of the present invention.

FIG. 1 is a view showing a configuration of a holder device for a power supply rail according to an embodiment of the present invention, FIG. 2 is a view showing an internal structure of the holder device for the power supply rail according to the embodiment of the present invention, and FIG. 3 is a view showing an operating state of the holder device for the power supply rail according to the embodiment of the present invention.

Figure 4:
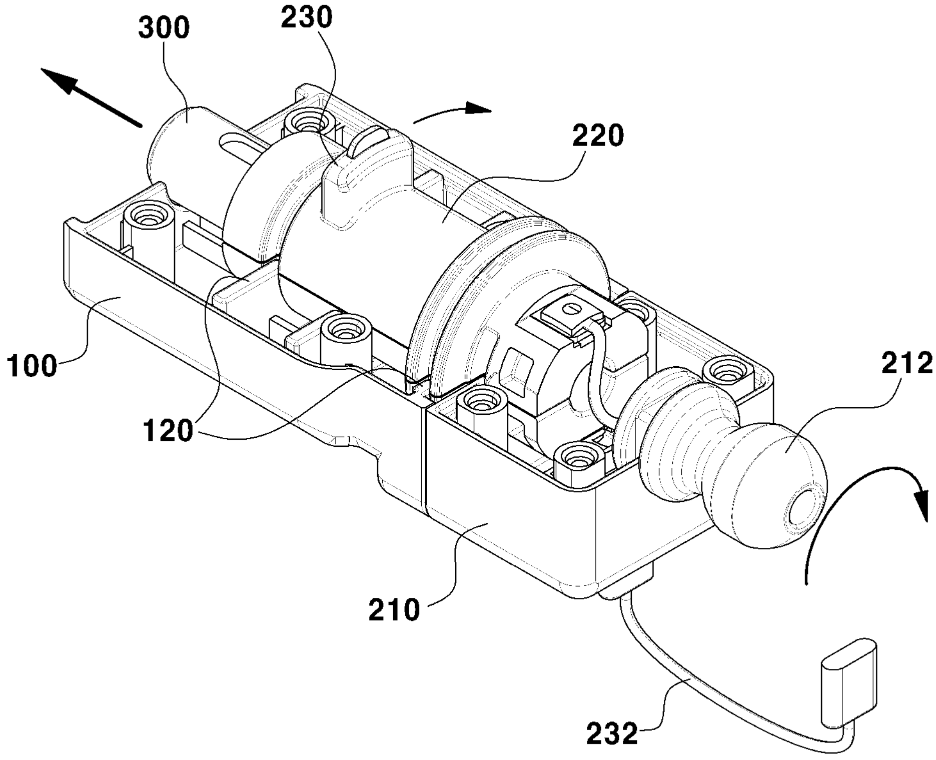
FIG. 4 is a view showing an internal structure according to the operating state of the holder device for the power supply rail according to the embodiment of the present invention.
Figure 5:
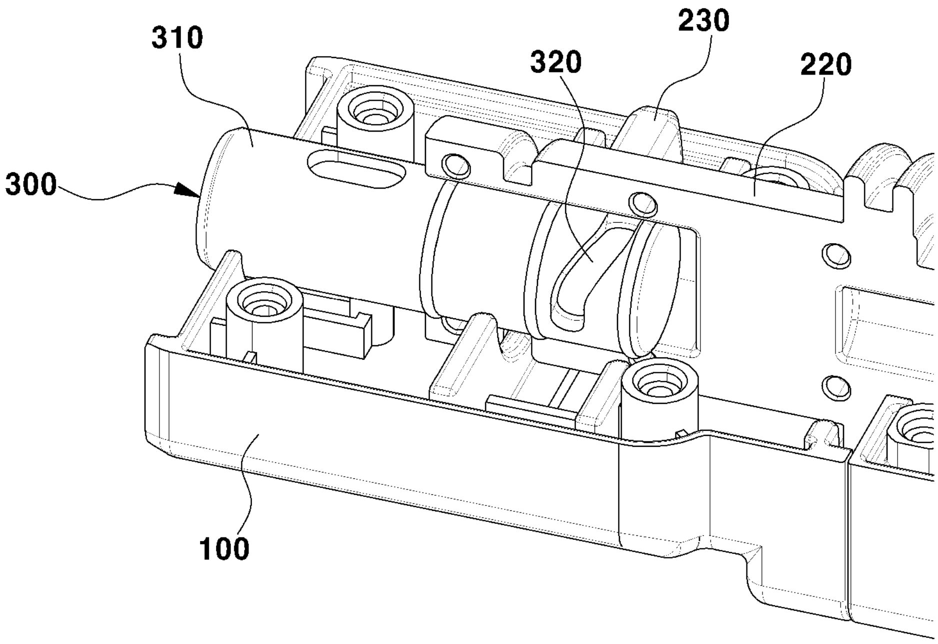
FIG. 5 is a view showing a cam movement groove of the holder device for the power supply rail according to the embodiment of the present invention.
Figure 6:
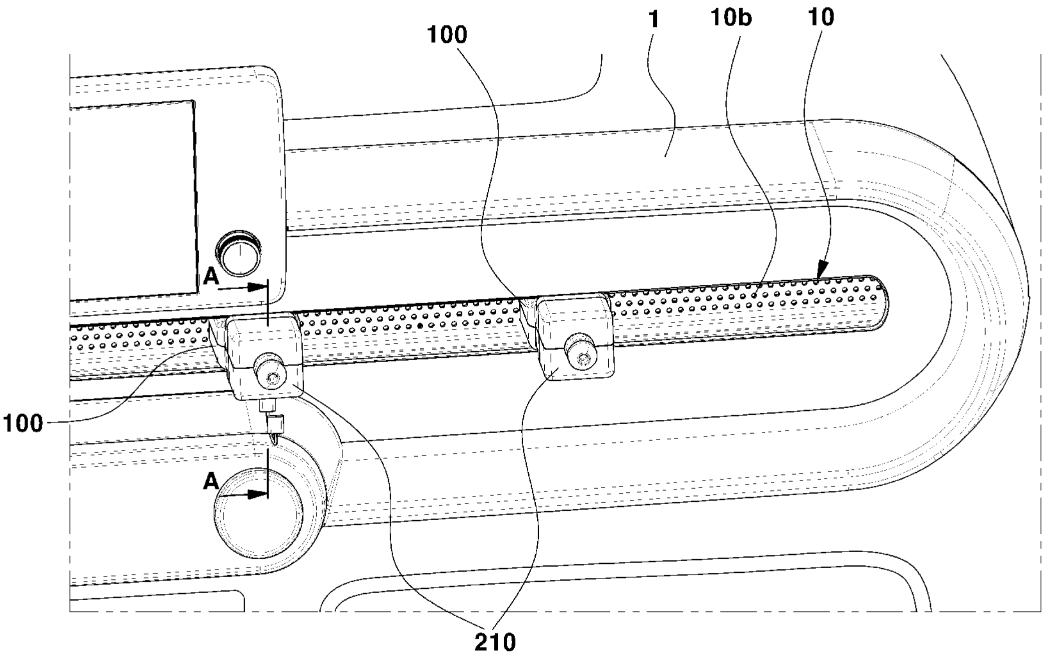
FIG. 6 is a view showing a mounted state of the holder device for the power supply rail according to the embodiment of the present invention.
Figure 7:
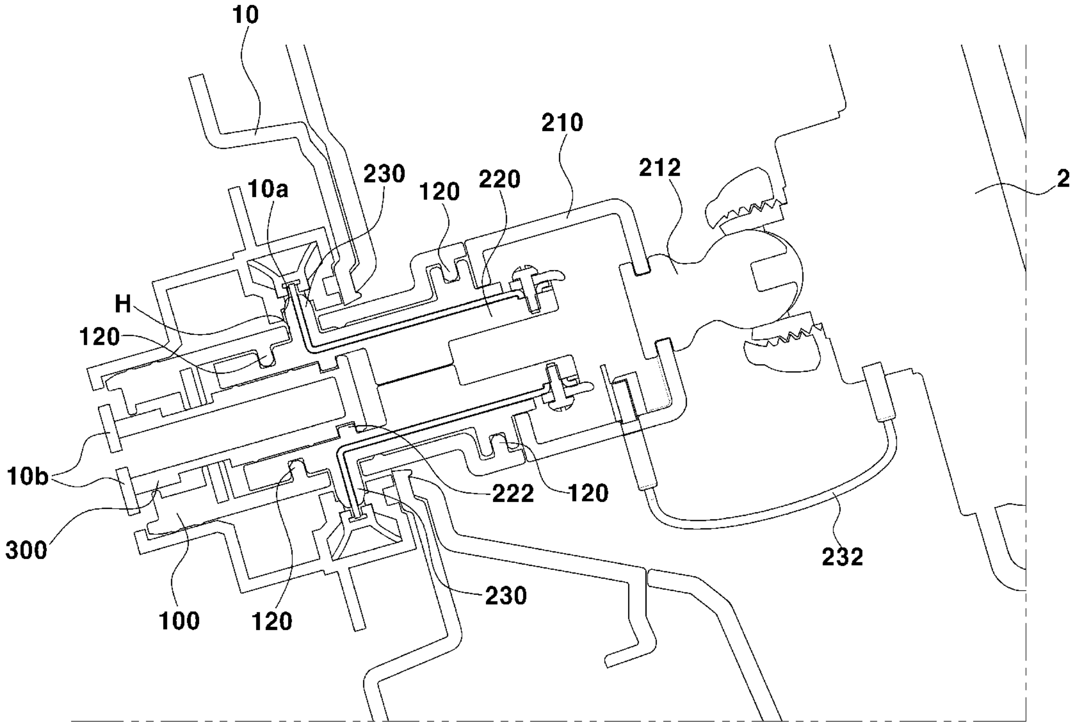
FIG. 7 is a cross-sectional view of the holder device for the power supply rail according to the embodiment of the present invention, taken along line A-A' of FIG. 6.

FIG. 4 is a view showing an internal structure according to the operating state of the holder device for the power supply rail according to the embodiment of the present invention, FIG. 5 is a view showing a cam movement groove of the holder device for the power supply rail according to the embodiment of the present invention, FIG. 6 is a view showing a mounted state of the holder device for the power supply rail according to the embodiment of the present invention, and FIG. 7 is a cross-sectional view of the holder device for the power supply rail according to the embodiment of the present invention, taken along line A-A' of FIG. 6.

Figure 8:
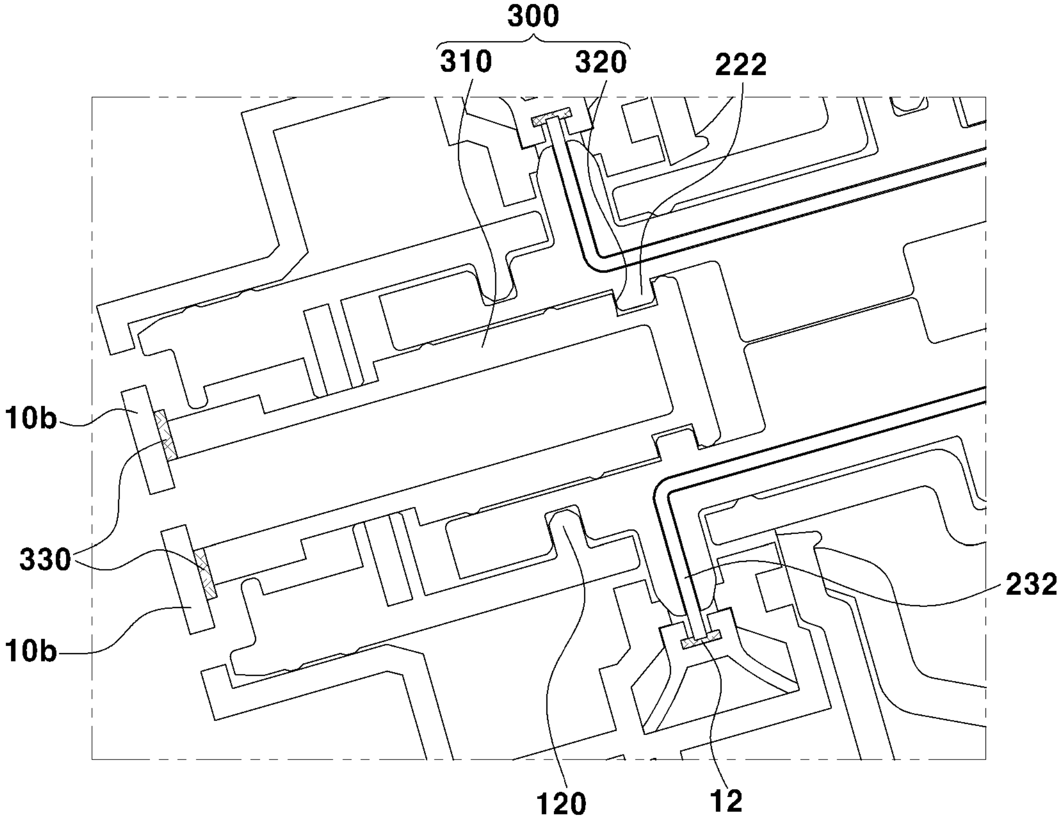
FIG. 8 is a view showing a fixing part of the holder device for the power supply rail according to the embodiment of the present invention.
Figure 9:
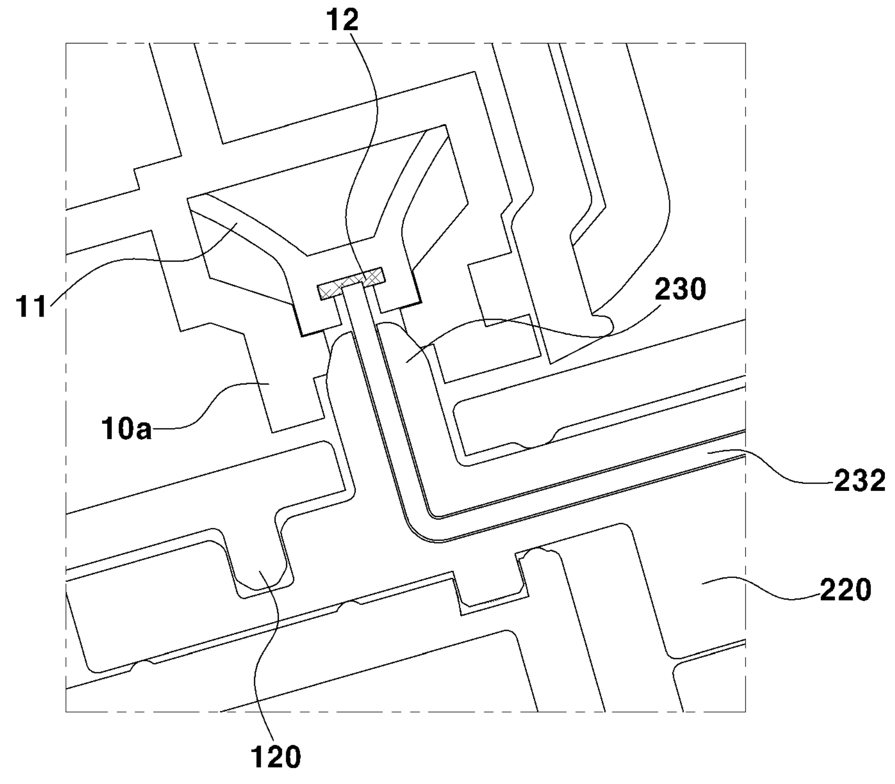
FIG. 9 is a view showing electrical connection between an electrode and a contact terminal with respect to the holder device for the power supply rail according to the embodiment of the present invention.
Figure 10:
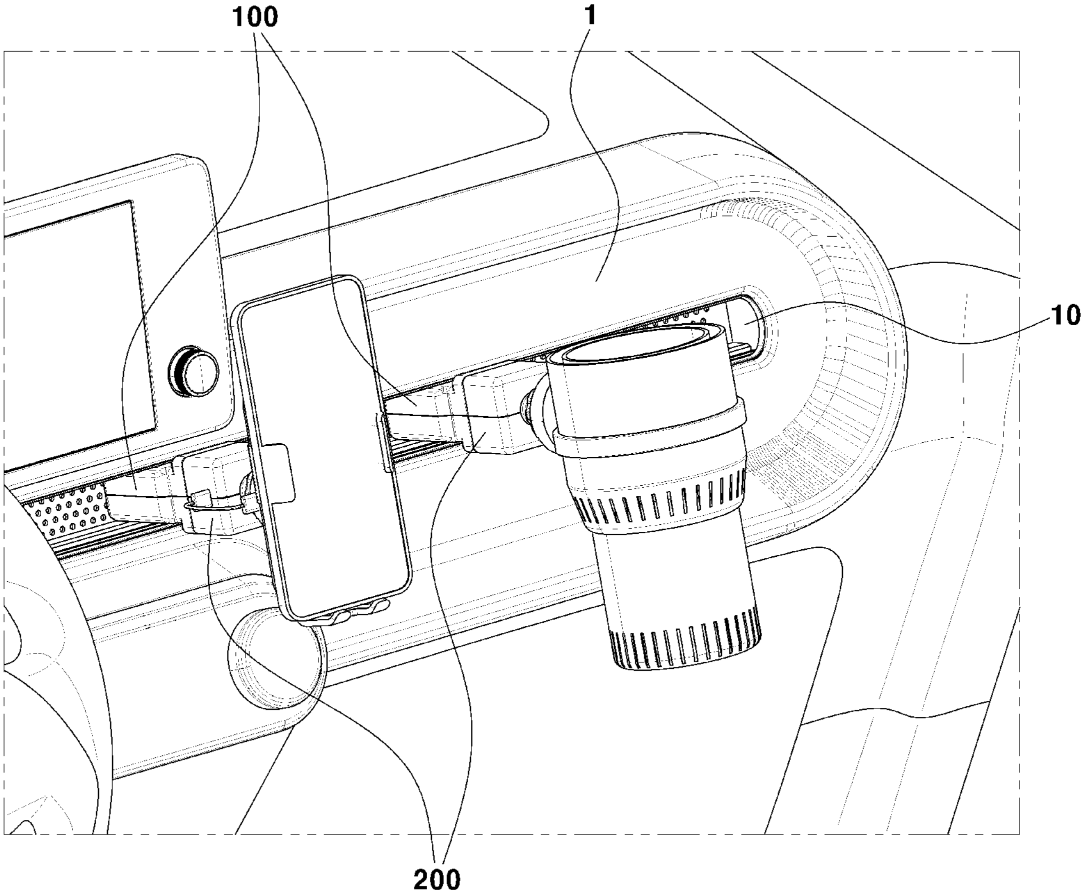
FIG. 10 is a view showing a state in which a mobile device is mounted on the holder device for the power supply rail according to the embodiment of the present invention.

FIG. 8 is a view showing a fixing part of the holder device for the power supply rail according to the embodiment of the present invention, FIG. 9 is a view showing electrical connection between an electrode and a contact terminal with respect to the holder device for the power supply rail according to the embodiment of the present invention, and FIG. 10 is a view showing a state in which a mobile device is mounted on the holder device for the power supply rail according to the embodiment of the present invention.

As shown in FIGS. 1 and 2, the holder device for the power supply rail according to the present embodiment includes a main body part 100, a head part 200, and a fixing part 300.

The main body part 100 has a length in the horizontal direction in the vehicle interior and is located inside a mounted power supply rail 10 (refer to FIGS. 6 and 10).

For example, the main body part 100 may be located in the power supply rail 10 mounted on the front side of a dashboard 1.

Here, the main body part 100 may be slidably movable in the rail direction in a state of being inserted into an inlet of the power supply rail 10, and may be formed in a rectangular enclosure shape so as not to be rotated.

Additionally, the main body part 100 may include a stepped part 110 configured to form a step to be locked at the entrance of the power supply rail 10, and as such, the head part 200 coupled to the stepped part 110 may be exposed to the outside of the power supply rail 10.

The head part 200 is rotatably coupled to the main body part 100, more specifically to the stepped part 110, and fixes the sliding movement position of the main body part 100 in the rail direction inside the power supply rail 10.

To this end, the head part 200 includes a rotation guide 210, a body 220, and a lock anchor 230.

The rotation guide 210 is coupled to the main body part 100, and when the stepped part 110 is locked at the entrance of the power supply rail 10, the rotation guide 210 is formed to be exposed to the outside of the power supply rail 10.

The rotation guide 210 includes a connection member 212 configured to be connected to a holder 2 configured to enable a personal mobile device such as a tablet PC to be mounted thereon.

The rotation guide 210 is provided to enable a user to grip the same, and when the user rotates the rotation guide 210, the main body part 100 locked at the entrance of the power supply rail 10 by the stepped part 110 is formed to be rotatable independently in a fixed state.

That is, the rotation guide 210 is formed in the shape of a rectangular enclosure in the same manner as the shape of the stepped part 110 of the main body part 100. Accordingly, as shown in FIGS. 3 and 4, the rotation of the rotation guide 210 may be performed at intervals of 90° to be disposed on the same line as the main body part 100 during rotation thereof.

The body 220 is coupled to the rotation guide 210 inside the main body part 100, and is provided to be rotated together when the rotation guide 210 rotates.

Referring to FIGS. 6 and 7, when the body 220 is rotated by the rotation guide 210, the body 220 may be stably rotated along a predetermined path by allowing a plurality of guide members 120 provided inside the main body part 100 to be inserted into the body 220.

Further, a pair of lock anchors 230 is formed to protrude from the body 220 and is selectively locked inside the power supply rail 10, and a contact terminal 232 extending from the outside of the rotation guide 210 is mounted to be in contact with a pair of electrodes 12 provided on the upper and lower portions of the power supply rail 10, respectively.

As shown in FIGS. 3 and 4, when the lock anchor 230 is rotated with the body 220 when the rotation guide 210 rotates clockwise, the same protrudes to the outside of the main body part 100 through a guide hole H provided at each of the upper and lower portions of the main body part 100 (refer to FIGS. 1 and 3), and then is locked in a locking groove 10*a* provided inside the power supply rail 10.

In other words, the locking groove 10*a* is provided at each of the upper and lower portions of the power supply rail 10, and when the lock anchor 230 is locked in the locking groove 10*a*, the position of the main body part 100 may be fixed inside the power supply rail 10. As described above, the lock anchor 230 is normally disposed in the horizontal direction for the sliding movement of the main body part 100 (refer to FIGS. 1 and 2), and when the body 220 is rotated together with the rotation guide 210 during the rotation of the rotation guide 210, the lock anchor 230 is disposed in the vertical direction to be locked in the locking groove 10*a*, and as such, the position of the main body part 100 inside the power supply rail 10 may be fixed (refer to FIGS. 3 and 4).

Here, an electrode fixing part 11 configured to fix the position of the electrode 12 may be provided inside the locking groove 10*a* of the power supply rail 10, as shown in FIG. 9, and the electrode fixing part 11 is fixed in the direction toward the contact terminal 232 protruding to the outside of the lock anchor 230 when the lock anchor 230 is locked in the locking groove 10*a*.

Preferably, the electrode fixing part 11 may be made of a material having elasticity. Accordingly, the electrode fixing part 11 maintains constant pressure on the electrode 12 in the direction toward the contact terminal 232, thereby achieving stable electrical contact between the electrode 12 and the contact terminal 232.

Meanwhile, the fixing part 300 is formed to selectively protrude to the outside of the main body part 100 when the head part 200 rotates.

Accordingly, the fixing part 300 is provided to support an inner side 10*b* of the power supply rail 10 in the state in which the lock anchor 230 is inserted into the locking groove 10*a* and locked therein, that is, the sliding movement position of the main body part 100 in the rail direction is fixed as described above (refer to FIG. 7).

To this end, the fixing part 300 includes a fixing member 310 and a cam movement groove 320, as shown in FIG. 5.

The fixing member 310 is inserted into the body 220, and when the body 220 is rotated by the rotation guide 210, the fixing member 310 is formed to selectively move to the rear of the main body part 100 and to protrude to the outside of the main body part 100.

The cam movement groove 320 is formed on the outer circumferential surface of the fixing member 310, and a protruding member 222 provided in the body 220 is inserted into the cam movement groove 320 (refer to FIG. 7). Further, the cam movement groove 320 forms a path configured to enable the protruding member 222 to move along a predetermined path when the body 220 rotates.

The cam movement groove 320 preferably has a spiral shape so that the fixing member 310 protrudes to the outside of the main body part 100 by the spiral shape thereof when the cam movement groove 320 is pressed by the protruding member 222 moving around the predetermined path during the rotation of the body 220.

In other words, when the rotation guide 210 rotates and the body 220 is rotated at an angle of 90° along the guide member 120, the protruding member 222 is inserted into the cam movement groove 320. Here, since the shape of the cam movement grove 320 is made in the form of a spiral, the protruding member 222 moves along the path of the cam movement groove 320 to move the fixing member 310. As a result, the fixing member 310 is moved to protrude to the rear of the main body part 100 and is in close contact with the inner side 10*b* of the power supply rail 10, thereby fixing and supporting the main body part 100.

Preferably, the fixing part 300 may further include an elastic member 330. The elastic member 330 is mounted on one side of the fixing member 310, as shown in FIG. 8. Here, the elastic member 330 is formed to selectively contact the inner side 10*b* of the power supply rail 10 when the fixing member 310 protrudes, thereby making it possible to stably fix and support the main body part 100.

That is, when the fixing member 310 is moved to protrude to the rear of the main body part 100 and is in close contact with the inner side 10*b* of the power supply rail 10, the elastic member 330 prevents slipping between the fixing member 310 and the inner side 10*b* during close contact therebetween, thereby making it possible to fix and support the main body part 100 more stably.

As a result, in this embodiment, when the rotation guide 210 is rotated to fix the main body part 100 configured to slide along the power supply rail 10, the body 220 is rotated together inside the main body part 100. Accordingly, the pair of lock anchors 230 is locked in the locking groove 10*a*, thereby making it possible to form two support areas inside the power supply rail 10 and to stably fix the main body part 100.

In addition, when the body 220 is rotated as described above, the protruding member 222 moves along the cam movement groove 320 having a spiral shape and pushes the fixing member 310 toward the rear of the main body part 100. In this manner, the fixing member 310 moves toward the rear of the main body part 100. Accordingly, the fixing member 310 together with the pair of lock anchors 230 also forms an additional support area and presses the inner side 10*b* of the power supply rail 10, thereby making it possible to effectively secure rigidity in the fixed state of the sliding movement position of the main body part 100.

In addition, in this embodiment, since the configuration of a separate locking lever configured to fix the sliding movement position of the main body part 100 in the power supply rail 10 can be removed, appearance quality can be improved. Further, since it is possible to fix and release the sliding movement position of the main body part 100 only by rotating the rotation guide 210, one-handed operation may be performed, and thus usability may be enhanced.

Meanwhile, in this embodiment, as described with reference to the drawings, the power supply rail 10 is installed with a predetermined length on the dashboard 1 of the vehicle interior, and a holder device is mounted on the power supply rail 10, but the above-mentioned configuration only corresponds to one embodiment and is not limited thereto. For example, in addition to the dashboard 1, the power supply rail 10 may be installed on a door trim or the like so that a holder device may be mounted at a corresponding position.

Further, in the case of the connection member 212 provided in the rotation guide 210 of the head part 200, this embodiment shows that the connection member 212 is coupled to the rear surface of the holder 2 in the form of a clip (refer to FIG. 7). Meanwhile, as long as the holder 2 is coupled to the connection member 212, various other structures having the same purpose may be applied to the connection member 212.

Additionally, as shown in FIG. 10, since a plurality of holder devices can be mounted together on the power supply rail 10, mobile devices such as a mobile phone and a tumbler may be simultaneously mounted thereon, and may be selectively slidable to move to a desired position and fixed thereat. Accordingly, the type and location of the mobile device may be changed and used depending on user convenience. Further, since the electrode 12 and the contact terminal 232 electrically contact each other inside the power supply rail 10 to perform recharging, it is possible to eliminate exposure of a plurality of members such as a charging cable, thereby maintaining the vehicle interior in a clean state.

According to the present invention, a main body part is inserted into a power supply rail mounted in the vehicle interior and is slidably movable, and a sliding movement position of the main body part in the power supply rail is fixed through the rotation of a head part. Further, the main body part may be additionally fixed in the power supply rail through a fixing member configured to selectively protrude from the main body part when the head part rotates, thereby having an effect of securing rigidity in the fixed state of the movement position of a mobile device mounted on the main body part.

Further, the present invention can eliminate the configuration of a separate locking lever configured to fix the sliding movement position of the main body part in the power supply rail, thereby having an effect of improving the appearance quality.

Additionally, since the present invention can fix and release the sliding movement position of the main body part only by rotating the head part, one-handed operation may be performed, thereby having an effect of improving usability.

As is apparent from the above description, according to the present invention, a main body part is inserted into a power supply rail mounted in the vehicle interior and is slidably movable. Here, a sliding movement position of the main body part in the power supply rail is fixed by the rotation of a head part. Further, the main body part may be additionally fixed in the power supply rail using a fixing member configured to selectively protrude from the main body part when the head part rotates. In this manner, it is possible to have an effect of securing rigidity in the fixed state of the movement position of a mobile device mounted on the main body part.

Further, according to the present invention, it is possible to eliminate the configuration of a separate locking lever configured to fix the sliding movement position of the main body part in the power supply rail, thereby having an effect of improving the appearance quality.

Additionally, according to the present invention, since the sliding movement position of the main body part in the power supply rail can be fixed and released only by rotating the head part, one-handed operation may be performed, thereby having an effect of improving usability.

The present invention has been described in detail with reference to preferred embodiments thereof, but the embodiments are merely exemplary and are not to be construed as limiting the present invention. It will be appreciated by those skilled in the art that various modifications may be made in these embodiments, and it will be understood that all or a part of the embodiments may be selectively combined and configured. Accordingly, the true technical protection scope of the present invention should be determined by the technical spirit of the appended claims.

What is claimed is:

1. A holder device for a power supply rail, the holder device comprising:
- a main body part positioned inside a power supply rail and provided to be slidably movable in a rail direction;
- a head part rotatably coupled to the main body part, configured to fix a sliding movement position of the main body part inside the power supply rail, and formed to contact a pair of electrodes provided inside the power supply rail; and
- a fixing part formed to protrude to an outside of the main body part when the head part rotates and provided to support an inner side of the power supply rail in a state in which the sliding movement position of the main body part is fixed;
- wherein the head part is identical to the main body part in size and shape and is disposed on a same line as the main body part during rotation.

2. The holder device of claim 1, wherein the head part comprises:
- a rotation guide positioned in front of the main body part and formed to be exposed to the outside of the power supply rail, the rotation guide comprising a connection member to be connected to a holder;
- a body coupled to the rotation guide inside the main body part and provided to be rotated simultaneously with rotation of the rotation guide; and
- a lock anchor formed to protrude from the body and positioned to be locked inside the power supply rail, wherein the lock anchor has a contact terminal mounted therein and configured to contact an electrode.

3. The holder device of claim 2, wherein the rotation guide is formed in a same shape as a rectangular enclosure shape of the main body portion, and rotates at intervals of 90°.

4. The holder device of claim 2, wherein when the body is rotated by the rotation guide, the body is stably rotated along a predetermined path by allowing a plurality of guide members provided inside the main body part to be inserted into the body.

5. The holder device of claim 2, wherein the lock anchor is formed to protrude to the outside of the main body part through a guide hole provided in the main body part when the rotation guide rotates to be locked in a locking groove provided in the power supply rail, and is electrically connected to the power supply rail through grounding between the electrode and the contact terminal.

6. The holder device of claim 5, wherein the locking groove is provided at each of the upper and lower portions of the power supply rail.

7. The holder device of claim 5, wherein the power supply rail comprises an electrode fixing part provided inside the locking groove to fix the electrode.

8. The holder device of claim 5, wherein the electrode fixing part configured to fix the electrode in a direction toward the contact terminal by elasticity thereof.

9. The holder device of claim 2, wherein the fixing part comprises:
- a fixing member inserted into the body and configured to selectively protrude to the outside of the main body part when the body rotates; and
- a cam movement groove formed on an outer circumferential surface of the fixing member.

10. The holder device of claim 9, wherein the cam movement groove has a protruding member inserted thereinto, the protruding member being provided inside the body, and forms a path configured to allow the protruding member to move therealong when the body rotates.

11. The holder device of claim 10, wherein the cam movement groove is formed in a spiral shape so that the cam movement groove is pressed by the protruding member moving along the path when the body rotates whereby the fixing member protrudes to the outside of the main body part.

12. The holder device of claim 9, wherein the fixing part further comprises an elastic member mounted on one side of the fixing member and formed to selectively contact the inner side of the power supply rail when the fixing member protrudes.

13. The holder device of claim 1, wherein the main body part is formed in a rectangular enclosure shape.

14. The holder device of claim 1, wherein the power supply rail is mounted in a vehicle interior.

15. A vehicle comprising the holder device of claim 1.

16. The vehicle of claim 15, wherein the power supply rail is mounted in a vehicle interior.

17. A holder device for a power supply rail, the holder device comprising:

a main body part positioned inside a power supply rail and provided to be slidably movable in a rail direction;

a head part rotatably coupled to the main body part, configured to fix a sliding movement position of the main body part inside the power supply rail, and formed to contact a pair of electrodes provided inside the power supply rail; and a fixing part formed to protrude to an outside of the main body part when the head part rotates and provided to support an inner side of the power supply rail in a state in which the sliding movement position of the main body part is fixed;

wherein the main body part comprises a stepped part formed to be locked in the power supply rail and configured to expose the head part rotatably coupled thereto to an outside of the power supply rail.

18. A holder device for a power supply rail, the holder device comprising:

a main body part positioned inside a power supply rail and provided to be slidably movable in a rail direction;

a head part rotatably coupled to the main body part and configured to fix a sliding movement position of the main body part inside the power supply rail, the head part comprising a connection member to be connected to a holder; and a fixing part formed to selectively protrude to an outside of the main body part when the head part rotates and provided to support an inner side of the power supply rail in a state in which the sliding movement position of the main body part is fixed;

wherein the head part is identical to the main body part in size and shape and is disposed on a same line as the main body part during rotation.

19. The holder device of claim 18, wherein at least one or more portions of the main body parts are formed to be positioned together inside the power supply rail, and the head part is rotatably coupled to the main body part, whereby the holder is mounted on a connection device and configured mount a mobile device thereon.

20. The holder device of claim 18, wherein the power supply rail is mounted on a front of a dashboard forming a vehicle interior.

* * * * *